United States Patent
Fujibayashi et al.

(10) Patent No.: US 7,331,208 B2
(45) Date of Patent: Feb. 19, 2008

(54) DIE CUSHION CONTROLLER

(75) Inventors: Kentaro Fujibayashi, Musashino (JP);
Tetsuo Hishikawa, Yamanashi (JP);
Keisuke Tsujikawa, Yamanashi (JP);
Noboru Hirose, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/259,111

(22) Filed: Oct. 27, 2005

(65) Prior Publication Data
US 2006/0090533 A1 May 4, 2006

(30) Foreign Application Priority Data
Oct. 28, 2004 (JP) ............... 2004-313721

(51) Int. Cl.
*B21J 9/18* (2006.01)
(52) U.S. Cl. .......................... 72/454; 72/20.1
(58) Field of Classification Search ............ 72/453.13, 72/20.1, 351, 350, 1, 31.11
See application file for complete search history.

(56) References Cited

U.S. PATENT DOCUMENTS 5,168,738 A * 12/1992 Bielfeldt .................. 72/21.1
5,435,166 A * 7/1995 Sunada .................... 72/351
2005/0274243 A1 12/2005 Kazuhiko

FOREIGN PATENT DOCUMENTS

CN 1714961 A 1/2006
JP 10-202327 * 4/1998

OTHER PUBLICATIONS

Notice of Examination Opinion for Patent Application No. 2005101168227 (5 pages) (1 page of partial English translation).

* cited by examiner

*Primary Examiner*—Derris H. Banks
*Assistant Examiner*—Debra M. Wolfe
(74) *Attorney, Agent, or Firm*—Staas & Halsey LLP

(57) ABSTRACT

A die cushion controller uses position control to position die cushion members for placement of a metal sheet. A pressing process starts and the upper die is lowered. When a position detector detects a position at which the upper die touches the sheet metal, the die cushion controller switches over from position control to pressure control and applies a preset pressure to the sheet metal. When the position detector detects that the upper die has risen to a preset position, the die cushion controller clears the positional deviation accumulated in position control to zero, then moves the die cushion members to preset positions and holds them there.

4 Claims, 3 Drawing Sheets

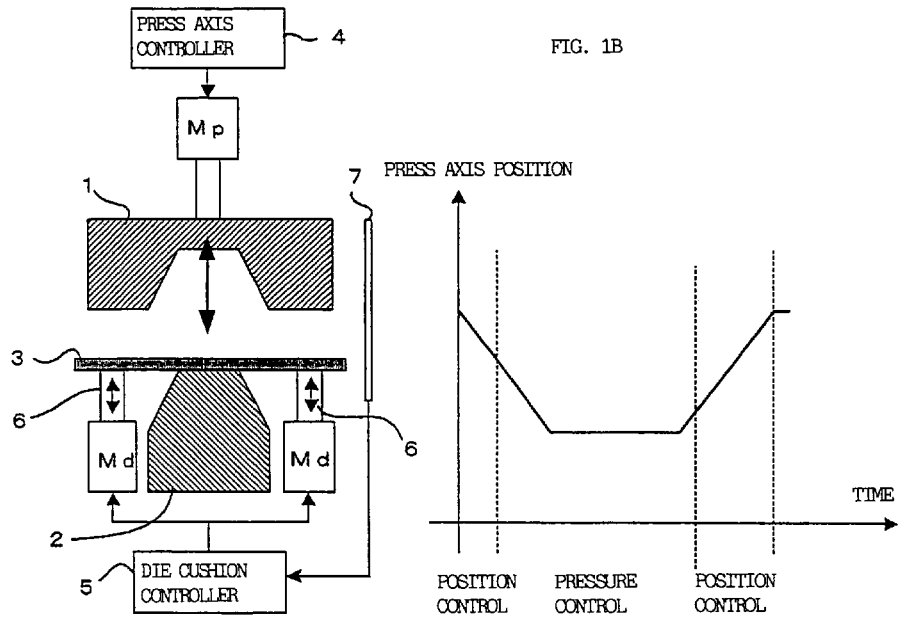
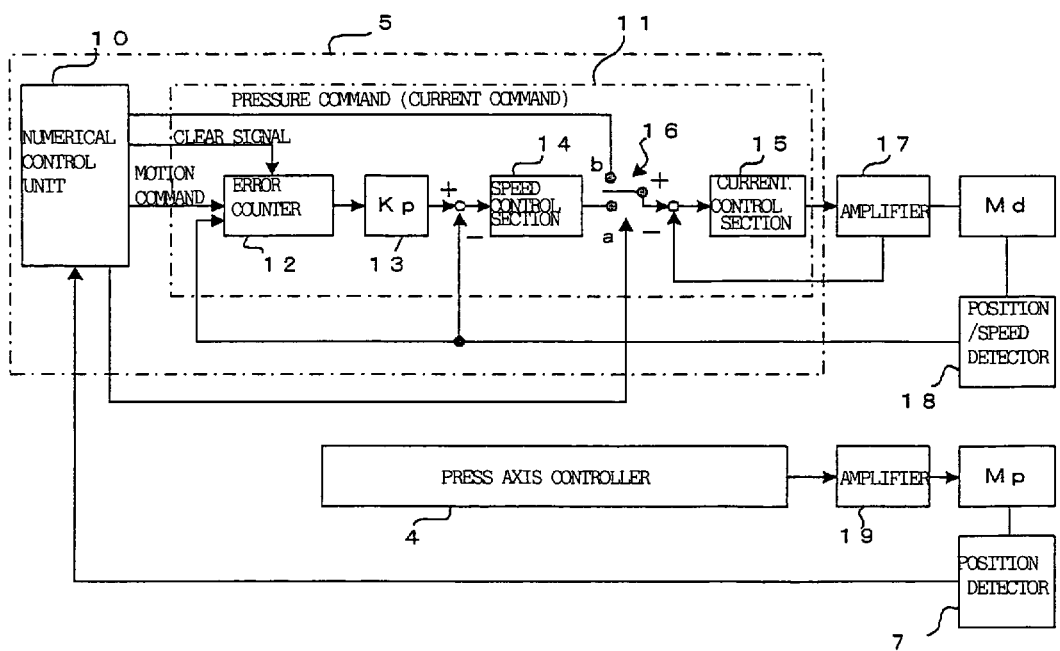

DIE CUSHION CONTROLLER

BACKGROUND OF THE INVENTION

1. Field of the Invention

The present invention relates to a controller that controls the die cushions of a press machine.

2. Description of the Related Art

A die cushion apparatus is used to alleviate changes in the pressure applied to a metal sheet, to avoid the sudden application of pressure when the sheet is clamped between metal dies by motion of the press axis of a press machine.

In conventional die cushion apparatus, hydraulic or pneumatic pressure is used to control the pressure applied to the metal sheet. The pressure is controlled by a controller of the die cushion apparatus after the upper die, which is mounted on the press axis of the press machine, is lowered and strikes the sheet metal. In die cushion control involving hydraulic or pneumatic pressure, however, there is a temporal delay from output of a control signal to response thereto, making it difficult to carry out control so as not to apply a surge of pressure due to an impact at the start of pressing to the metal sheet.

To solve this problem, Japanese Patent Application Laid-open No. 10-202327 proposes a die cushion apparatus having a servo motor that raises and lowers the die cushion, selectively carrying out position control of cushion stroke and pressure control by current torque control by using the servo motor.

In the above patent document, the touch point at which the upper die comes into contact with the cushion pads of the die cushion apparatus is recognized by detecting the change in the value of the current in the servo motor that drives the cushion pads. Accordingly, the switchover from position control to pressure control is delayed, causing the problem of inability to reduce the shock at the time of the touch on the cushion pads. During position control, the cushion pad driving servo motor holds the cushion pads at a preset position, and when the upper die strikes the cushion pads in this state, it tries to push the cushion pad down.

The servo motor, however, tries to hold the cushion pads at the commanded position, as a result, its driving current increases and therefore its output torque increases accordingly. Although switchover to pressure control is made upon detection of the increased driving current, the pressure has already increased, thereby affecting the metal sheet to be pressed.

In control of the switchover of the die cushion from position control, by which the die cushions are held in a prescribed position, to pressure control and vice versa, another problem is that at the return from pressure control to position control, the positional deviation that has accumulated during pressure control causes the servo motor to be driven suddenly, generating mechanical shock.

SUMMARY OF THE INVENTION

The present invention relates to a die cushion controller that controls pressure applied by a die to a workpiece placed on die cushion members when a press axis to which the die is attached is driven.

A die cushion controller according to a first aspect of the present invention has a die cushion servo motor that raises and lowers a die cushion member, die cushion control means that controls the die cushion servo motor, and a position detector mounted on the press axis. The die cushion control means switches the die cushion servo motor from position control to pressure control and vice versa according to the press axis position detected by the position detector.

A die cushion controller according to a second aspect of the present invention has a press axis servo motor that drives a press axis, a die cushion servo motor that raises and lowers a die cushion member, and control means that controls the press axis servo motor and the die cushion servo motor. The die cushion servo motor is switched from position control to pressure control and vice versa according to a position command to the press axis issued by the control means.

In the die cushion controller of this aspect, the die cushion servo motor may be switched from position control to pressure control and from pressure control to position control according to the position feedback which is used in position feedback control of the press axis carried out by the control means, in place of according to a position command to the press axis issued by the control means.

A die cushion controller according to a third aspect of the present invention has a press axis driver that drives a press axis, a die cushion servo motor that raises and lowers a die cushion member, die cushion control means that controls the die cushion servo motor, and a position detector mounted on the press axis. The die cushion control means switches the die cushion servo motor from position control to pressure control and vice versa according to the press axis position detected by the position detector, and also controls the press axis driver.

In the die cushion controllers of the first to third aspects, the control means for controlling the die cushion servo motor may have means for outputting a command that clears a positional deviation, which is a difference between a command position and a detected position, accumulated in a position loop control section in a servo control unit in the control means, at the time of a switchover from pressure control to position control.

The die cushion controller according to the present invention can lessen the delay during a switchover from position control to pressure control, and can thereby reduce shock generating when the die comes into contact with the metal sheet. Furthermore, when pressure control is switched back to position control, the positional deviation accumulated during pressure control is cleared before position control starts. Accordingly, abrupt acceleration does not occur during the switch back to position control, and shock can be avoided.

BRIEF DESCRIPTION OF THE DRAWINGS

The purposes and advantages of the present invention, including those described above, will be clarified with reference to the attached drawings in combination with the description of the embodiments presented below. Of these drawings:

FIG. 1A schematically illustrates control of the operation of a press machine by using the die cushion controller according to a first embodiment of the present invention;

FIG. 1B illustrates switchover between position control and pressure control of the die cushion with respect to the position of the press axis, in the press operation shown in FIG. 1A;

FIG. 2 is a block diagram of the control systems of the die cushion controller and the control system of the press axis controller, shown in FIG. 1A;

DETAILED DESCRIPTION OF THE PREFERRED EMBODIMENTS

Figure 3A:
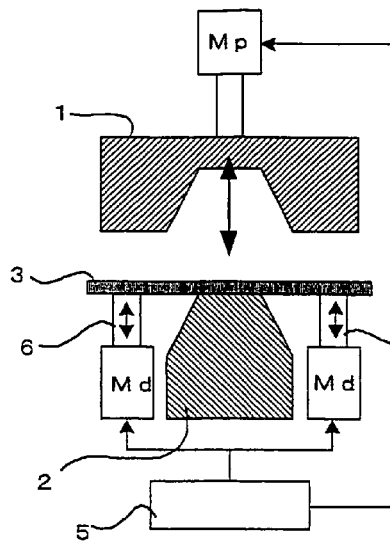
FIG. 3A schematically illustrates control of the operation of a press machine by using the die cushion controller according to a second embodiment of the present invention.

FIG. 1A schematically illustrates how a die cushion controller according to a first embodiment of the present invention is used to control the operation of a press machine. The lower die 2 of the mold is fixed to the base of the press machine, and the upper die 1 is fixed to the press axis in the direction facing the lower die 2.

A press axis controller 4 drives a press axis motor Mp, by which the upper die 1 fixed to the press axis is driven upward and downward, as indicated in the figure. The press axis, to which the upper die 1 is fixed, may be driven by means of a crank mechanism or by hydraulic or pneumatic pressure as in the prior art, or under position control by a servo motor as described below; any system that can drive the clamp axis (the upper die 1) in a fixed pattern of up-and-down motion may be used.

The lower die 2 is provided with a plurality of die cushion members 6 arranged so as to be driven up and down by respective servo motors Md, as shown in the figure. Although two die cushion members 6 paired with two die cushion servo motors Md are provided in the example in FIG. 1A, three or four pairs may be provided; alternatively, the plurality of die cushion members 6 may be integrated into one member and driven by a single die cushion servo motor.

The driving of the die cushion servo motors Md is controlled by the die cushion controller 5.

There is also provided a position detector 7 that detects the position of the upper die 1, that is, the position of the press axis, the output of the position detector being inputted to the die cushion controller 5. Although a linear position detector 7 is shown as an example in the embodiment in FIG. 1, a rotary position detector may also be mounted on, for example, the motor shaft that drives the press axis.

A metal sheet 3 to be pressed is placed on the die cushion members 6, and rests on the lower die 2.

FIG. 1B illustrates the switchover between position control and pressure control of the die cushions with respect to the position of the press axis (the upper die 1) during the press machine operation shown in FIG. 1A. In FIG. 1B, the horizontal axis represents time and the vertical axis represents press axis position (or the position of the upper die 1 detected by the position detector 7). The press axis is driven in a fixed pattern, as shown in FIG. 1B.

The die cushion controller 5 performs position control to hold the die cushion members 6 at preset positions, thereby holding the metal sheet 3 that rests on the die cushion members 6 in its proper position. The press axis is driven so that the upper die 1 is lowered. When the position detector 7 detects that the upper die 1 has reached the position at which it touches the metal sheet 3 on the die cushion members 6, the die cushion controller 5 switches from position control to pressure control and performs pressure control to maintain a constant pressure or follow a fixed pressure pattern. Then the press axis is raised. When the position detector 7 detects that the upper die 1 has reached a predetermined position, the die cushion controller 5 switches from pressure control to position control, moves the die cushion members to the preset positions, and holds them there. This operation is performed repeatedly as the metal sheet is pressed.

FIG. 2 is a block diagram of the control systems of the die cushion controller 5 and press axis controller 4 shown in FIG. 1A.

The die cushion controller 5 comprises a numerical control unit 10 and a servo control unit 11. The servo control unit 11 has an error counter 12 and an element 13 giving a position loop gain Kp, which constitute a position loop control section, as well as a speed control section 14 and a current control section 15. This structure is almost the same as the structure of a conventional servo control unit. In this embodiment, however, a switch 16 is provided between the speed control section 14 and current control section 15. An input to the current control section 15 is selected from either a torque command from the speed control section 14 or a pressure command (a current command) outputted from the numerical control unit 10, by means of the switch 16.

The output from the current control section 15 is inputted through an amplifier 17 to the die cushion servo motor Md, and is used to control the driving of the servo motor Md. Speed and position data is fed back from a position/speed detector mounted on the servo motor Md.

The press axis controller 4 drives the press axis motor Mp through another amplifier 19. The driving of the press axis may be implemented by use of a crank mechanism or the like as in the prior art, so that the press axis (the upper die 1) operates in a fixed pattern. The numerical control apparatus may also drive the press axis in a fixed pattern by means of a servo motor, as in the case of driving of the die cushion members. Alternatively, a hydraulic or pneumatic mechanism may be used to drive the press axis in the fixed pattern, without using a motor.

The output from the position detector 7, which detects the position of the upper die 1 driven by the press axis motor, is inputted to the numerical control unit 10 in the die cushion controller 5.

The die cushion controller 5 shown in FIG. 1A controls the die cushions of the press machine by using the control system shown in FIG. 2.

First, the switch 16 is set to side "a", permitting the output from the speed control section 14 to be supplied to the current control section 15. The numerical control unit 10 then outputs to the servo control unit 11 a motion command for moving the die cushion member 6 to the preset position at which the metal sheet 3 is to be held. The error counter 12 obtains positional deviation by subtracting the position feedback provided by the position/speed detector 18 from the motion command.

A speed command is determined by multiplying the output (the positional deviation) from the error counter 12 by the position loop gain Kp. A speed deviation is obtained by subtracting the speed feedback provided by the position/speed detector 18 from the speed command. The speed control section 14 carries out speed loop control such as proportional integral (PI) control according to the difference in speed, and obtains a torque command (a current command). The obtained torque command is supplied to the current control section 15 through the switch 16, which has been set to side "a". A difference in current between the torque command and the current feedback signal from a current detector provided in the amplifier 17 is obtained. Current loop control is carried out according to the difference in current, controlling the driving of the die cushion servo motor Md through the amplifier 17. Position control is then performed so that the die cushion member 6 is held at the commanded preset position.

The metal sheet 3 is placed on the die cushion members 6 held at the preset positions, and when a press command is issued, the press axis controller 4 drives the press axis motor Mp through the amplifier 19 and lowers the upper die 1. The position detector 7 detects the position of the upper die 1, and sends the detection result to the numerical control unit 10 in the die cushion controller 5. When the numerical control unit 10 in the die cushion controller 5 is notified by a signal from the position detector 7 that the upper die 1 has reached a preset position (the position at which the upper die 1 touches the metal sheet 3) with the press axis lowered, the numerical control unit 10 sets the switch 16 to side "b" and outputs a pressure command (a current command) through the switch 16 to the current control section 15. The current control section 15 carries out pressure control by performing current loop control according to the difference between the pressure command and current feedback After the driving of the press axis brings the upper die 1 down into contact with the metal sheet 3, the upper die 1 presses the metal sheet 3 and die cushion members 6 together. The pressing force acts on the die cushion servo motors Md as a load.

After the upper die 1 starts to press the metal sheet 3, the command to the current control section 15 is switched to a pressure command to be outputted from the numerical control unit 10, as described above. As a result, the die cushion servo motors Md are controlled by pressure feedback control so that their output torque match the pressure command, and the die cushion members 6 are pressed down together with the upper die 1 as the metal sheet 3 is clamped between the upper die 1 and lower die 2 and pressed.

After that, the press axis rises. When the position detector 7 detects that the press axis has risen to the preset position, the numerical control unit 10 clears the error counter 12. During pressure control, the die cushion servo motors Md also move in association with the motion of the die cushion members 6, and the amount of the motion is accumulated in the error counter 12, so a command for canceling the positional deviation accumulated in the error counter 12 is outputted to clear the content of the error counter to zero. At the same time, coordinates stored in a current position register are updated to correspond to the current position of the press axis. A command for setting the switch 16 to side "a" is then outputted. The numerical control unit 10 outputs a motion command that specifies upward motion up to the preset position corresponding to the position at which the metal sheet 3 is placed.

Since the switch 16 has been set to side "a", position control is then performed according to the motion command. Specifically, position loop control by the error counter 12 and element 13, speed loop control by the speed control section 14, and current loop control by the current control section 15 are performed to drive the die cushion servo motors Md, move the die cushion members 6 to their preset positions, and hold them there. The above operation is repeated as pressing of the metal sheet 3 continues under die cushion control.

Figure 3B:
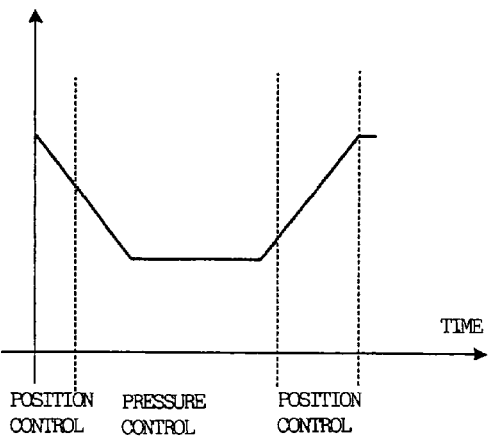
FIG. 3B illustrates switchover between position control and pressure control of the die cushion with respect to the position of the press axis, in the press operation shown in FIG. 3A.

FIG. 3A schematically illustrates how a die cushion controller according to a second embodiment of the present invention is used to control the operation of a press machine. FIG. 3B illustrates the switchover between position control and pressure control of the die cushion, with respect to the position of the press axis (the upper die 1), during the press machine operation shown in FIG. 3A. Elements corresponding to elements in the first embodiment have the same reference numerals as those in the first embodiment.

The second embodiment differs from the first embodiment in that a servo motor is used as the press axis motor Mp and the controller 5 that controls the die cushion servo motors also controls the servo motor Mp. Furthermore, the second embodiment lacks the position detector 7 provided in the first embodiment to detect the position of the upper die (the workpiece).

In the second embodiment, the driving of the press axis servo motor is also controlled by the numerical control unit 10 that controls the driving of the die cushion servo motors Md, and the switchover from position control for the die cushion servo motors Md to pressure control or vice versa is made according to position commands issued for the press axis.

The motion commanding pattern used to drive the press axis is programmed as shown in, for example, FIG. 3B, and in the motion commanding pattern, a command that operates the switch 16 so that pressure control is selected (sets the switch 16 to side "b") is programmed for execution at a point at which the upper die 1 touches the metal sheet 3 during downward motion, and another command that operates the switch 16 so that position control is selected (sets the switch 16 to side "a") is programmed for execution while the upper die 1 is being lifted.

Figure 4:
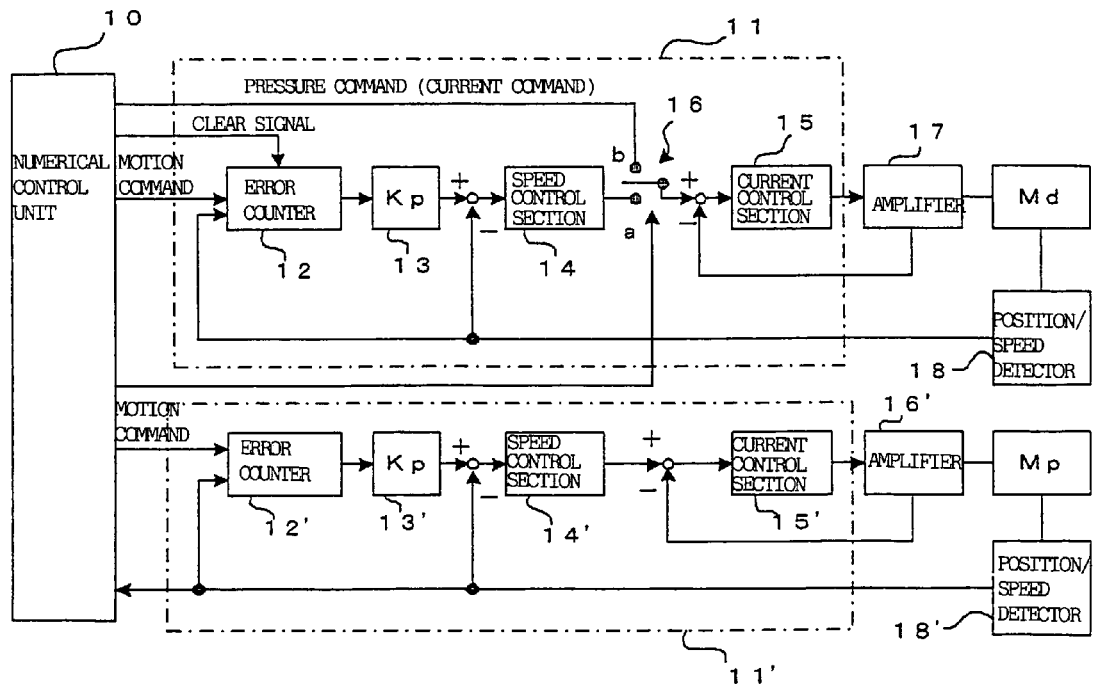
FIG. 4 is a block diagram of the servo control system of the die cushion controller shown in FIG. 3A.

FIG. 4 is a block diagram of the servo control system of the die cushion controller 5 shown in FIG. 3A.

As seen from FIG. 4, the structure of the servo control unit 11 that controls the die cushion servo motors Md is the same as in the first embodiment. The structure of the servo control unit 11' that controls the press axis servo motor Mp for driving the press axis is the same as the structure of the servo control unit 11, except that the switch 16 is not provided, so that identical elements are assigned the same reference numerals, but the reference numerals assigned to the servo control unit 11' are distinguished by a dash (') suffix. In the second embodiment, the press axis servo motor Mp also operates under servo control, so, as in die cushion control, position loop, speed loop, and current loop control are carried out according to fixed-pattern motion commands outputted from the numerical control unit 10, and the press axis (the upper die 1) is also controlled by the numerical control unit 10.

Operation in the second embodiment will be described below.

First, as in the first embodiment, the switch 16 is set to the position control side (side "a") according to a command from the numerical controller 10. A motion command for motion to a preset position is outputted for the die cushion servo motors Md to position the die cushion members 6 at the preset positions and hold them there. After the metal sheet to be pressed is placed on the die cushion members 6, fixed-pattern motion commands are outputted for the press axis. The servo control unit 11' performs the above position loop control, speed loop control, and current loop control according to these motion commands, and drives the press axis (the upper die 1) in a fixed motion pattern.

When the motion command sequence has reached the point at which the upper die 1 touches the metal sheet 3, the numerical control unit 10 outputs a command for setting the switch 16 to the pressure control side (side "b") and also outputs a preset pressure command (a current command). Consequently, die cushion control is switched from position control to pressure control, and the current control section 15 carries out pressure loop control according to the pressure command and current feedback, controlling the die cushion servo motors Md. A preset pressure is applied to the metal sheet 3, and the die cushion members 6 move downward together with the upper die 1, so that the metal sheet 3 is pressed by the upper die 1 and lower die 2.

The press axis (the upper die 1) then starts to rise. When a preset position is reached, a command for switching from pressure control to position control is outputted, and another command for clearing the positional deviation accumulated in the error counter 12 is also outputted to clear the error counter to zero. At the same time, the coordinates stored in the current position register are updated to correspond to the current position of the press axis. A motion command for positioning the die cushion members 6 at the preset initial position is outputted, and another command for a switchover to the position control side (side "a") is outputted to the switch 16. Accordingly, position control is carried out, and the die cushion members 6 is returned to and held at their initial positions, at which the metal sheet 3 is placed. The above operation is repeated as pressing process proceeds under die cushion control.

Figure 5A:
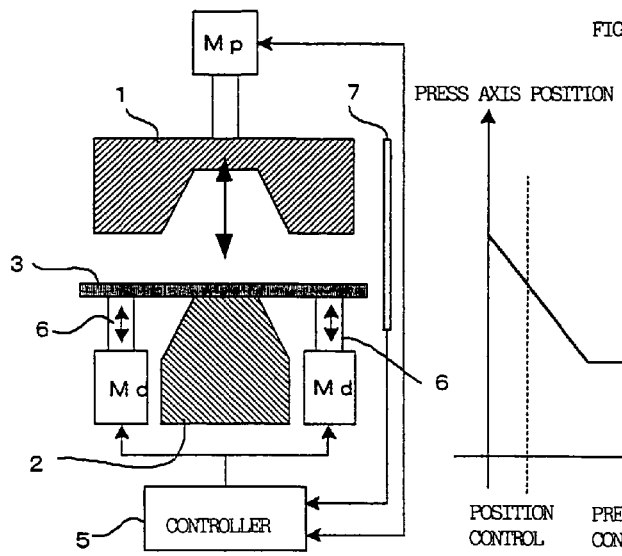
FIG. 5A schematically illustrates control of the operation of a press machine by using the die cushion controller according to a third embodiment of the present invention.
Figure 5B:
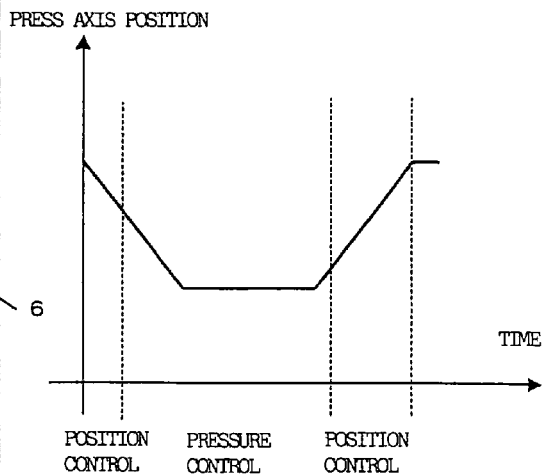
FIG. 5B illustrates switchover between position control and pressure control of the die cushion with respect to the position of the press axis, in the press operation shown in FIG. 5A.

FIG. 5A schematically illustrates how a die cushion controller according to a third embodiment of the present invention is used to control the operation of a press machine. FIG. 5B illustrates the switchover between position control and pressure control of the die cushion, with respect to the position of the press axis (the upper die 1), during the press machine operation shown in FIG. 5A. Elements corresponding to elements in the first and second embodiments have the same reference numerals as those in the first and second embodiment.

The third embodiment is similar to the second embodiment in that a controller that controls the die cushion also controls the press axis, but is similar to the first embodiment in having a position detector 7 that detects the position of the upper die 1 (the press axis) and in switching over from position control to pressure control of the die cushion or vice versa according to the position of the upper die 1 (the press axis) detected by the position detector 7.

Figure 6:
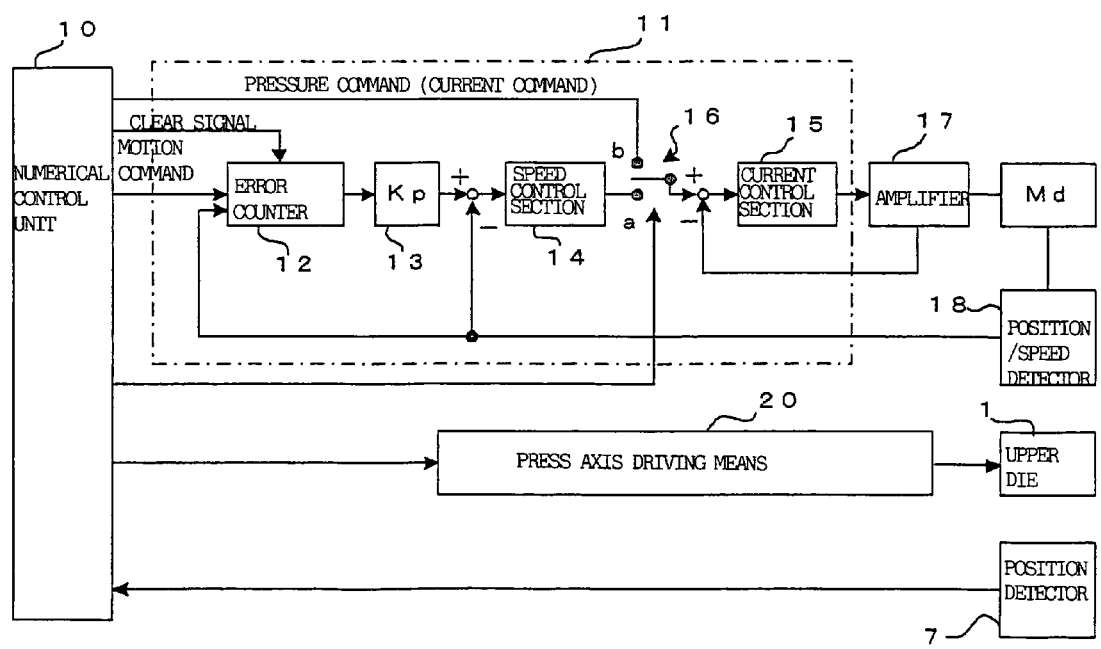
FIG. 6 is a block diagram of the servo control system of the die cushion controller shown in FIG. 5A.

FIG. 6 is a block diagram of the servo control system of the die cushion controller 5 shown in FIG. 5A.

In the third embodiment, a servo motor may be used as the press axis driver 20, as in the second embodiment, to enable the servo control unit 11' to drive the upper die 1 by means of the servo motor. Alternatively, the driving may be achieved by a motor that moves the upper die 1 upward and downward through a crank mechanism. Although a motor is used to drive the press axis in the example in FIG. 5, the press axis driver 20 may be a press axis driving means that drives the press axis in a fixed pattern by using a hydraulic or pneumatic mechanism or other means.

In the third embodiment, as in the preceding embodiments, the switch 16 in the servo control unit 11 is set to side "a" to enable the servo control section 11 to carry out position control. The die cushion members 6 are held at preset positions, a metal sheet 3 is placed on the die cushion members 6, and a driving command is then outputted from the numerical control unit 10 to the press axis driver 20, so that the press axis is driven, lowering the upper die 1. When the position detector 7 detects that the position of the upper die 1 reaches a preset position (touching the metal sheet 3), the numerical control unit 10 outputs a switchover command to set the switch 16 to the pressure control side (side "b") and outputs a pressure command (a current command). In this way, as described in the explanations of the first and second embodiments, die cushion control is switched from position control to pressure control and the die cushion servo motors Md operate under pressure control so that their output torque matches the pressure command.

The press axis is then raised. When the position detector 7 detects that another preset position is reached, the numerical control unit 10 outputs a command that clears the positional deviation accumulated in the error counter 12 to zero. At the same time, the coordinates stored in the current position register are updated to correspond to the current position of the press axis. A command for operating the switch 16 is outputted to select side "a", a motion command for positioning the die cushion members 6 at the preset initial positions is outputted, and position control is carried out to return the die cushion members 6 to their initial positions, at which the metal sheet 3 is placed, so that the die cushion members 6 are held there.

The above operation is repeated as the pressing process is performed under die cushion control.

The invention claimed is:

1. A die cushion controller that controls pressure applied by a die to a workpiece placed on a die cushion member when the die is driven along a press axis, the die cushion controller comprising:
    a press axis servo motor for driving the die along the press axis;
    a die cushion servo motor for raising and lowering the die cushion member; and
    control means for controlling the press axis servo motor and the die cushion servo motor;
    wherein control of the die cushion servo motor is switched from position control to pressure control and from pressure control to position control according to a position command which is issued to the press axis servo motor by the control means for controlling the press axis servo motor, and
    the control means for controlling the die cushion servo motor has means for outputting a command that clears a positional deviation, which is a difference between a command position and a detected position, accumulated in a position loop control section in a servo control unit in the control means, at the time of a switchover from pressure control to position control.

2. A die cushion controller that controls pressure applied by a die to a workpiece placed on a die cushion member when the die is driven along a press axis, the die cushion controller comprising:
    a press axis servo motor for driving the die along the press axis;
    a die cushion servo motor for raising and lowering the die cushion member; and
    control means for controlling the press axis servo motor and the die cushion servo motor,
    wherein the die cushion servo motor is switched from position control to pressure control and from pressure control to position control according to the position feedback which is used in position feedback control of the press axis servo motor carried out by the control means for controlling the press axis servo motor, and
    the control means for controlling the die cushion servo motor has means for outputting a command that clears a positional deviation, which is a difference between a command position and a detected position, accumulated in a position loop control section in a servo control unit in the control means, at the time of a switchover from pressure control to position control.

3. A die cushion controller that controls pressure applied by a die to a workpiece placed on a die cushion member when the die is driven along a press axis, the die cushion controller comprising:
a press axis driver for driving the die along the press axis;
a die cushion servo motor for raising and lowering the die cushion member;
die cushion control means for controlling the die cushion servo motor; and
a position detector mounted along the press axis;
wherein the die cushion control means switches control of the die cushion servo motor from position control to pressure control and from pressure control to position control according to the position of the die detected by the position detector, and also controls the press axis driver, and
the control means for controlling the die cushion servo motor has means for outputting a command that clears a positional deviation, which is a difference between a command position and a detected position, accumulated in a position loop control section in a servo control unit in the control means, at the time of a switchover from pressure control to position control.

4. A die cushion controller that controls pressure applied by a die to a workpiece placed on a die cushion member when the die is driven along a press axis, the die cushion controller comprising:
a die cushion servo motor for raising and lowering the die cushion member;
die cushion control means for controlling the die cushion servo motor; and
a position detector mounted along the press axis;
wherein said die cushion control means has means for outputting a command that clears a positional deviation, which is a difference between a command position and a detected position, accumulated in a position loop control section in a servo control unit in the control means, when control of the die cushion servo motor is switched over from pressure control to position control and from position control to pressure control according to the position of the die detected by the position detector.

* * * * *